Aug. 5, 1969        E. CORDIANO        3,459,286
SYNCHRONISER FOR A MOTOR VEHICLE GEARBOX
Filed July 17, 1967        3 Sheets-Sheet 1

Aug. 5, 1969 E. CORDIANO 3,459,286
SYNCHRONISER FOR A MOTOR VEHICLE GEARBOX
Filed July 17, 1967 3 Sheets-Sheet 3

United States Patent Office 3,459,286
Patented Aug. 5, 1969

3,459,286
SYNCHRONISER FOR A MOTOR VEHICLE GEARBOX
Ettore Cordiano, Turin, Italy, assignor to Fiat Società per Azioni, Turin, Italy
Filed July 17, 1967, Ser. No. 653,898
Claims priority, application Italy, July 19, 1966, 775,026/66
Int. Cl. F16d *11/00, 13/00;* F16h *3/38*
U.S. Cl. 192—53                    3 Claims

ABSTRACT OF THE DISCLOSURE

The invention relates to improvements in synchronisers for motor vehicle gearboxes and seeks to prevent the undesirable effects of wear exhibited by the internal splines of a sleeve which surrounds an externally splined hub. Such wear has in the past resulted in the sleeve slipping off the hub and the invention prevents this by providing a plurality of auxiliary splines on the hub. These splines are larger in chordal thickness and smaller in axial length than the normal or so-called herein "basic" splines. In use, there is abutment of the sleeve splines and the auxiliary splines of the hub as well as the said basic splines and wear of the basic splines is compensated for automatically.

---

The invention relates to improvements in synchronisers for motor vehicle gearboxes, of the general type which may be defined as having a conical ring adapted frictionally to connect a driving member with an output shaft of the gearbox, and a sleeve which is angularly keyed, by means of internal splines thereon, to an externally splined hub which is secured to the said output shaft, the sleeve being capable of axial sliding displacement in order to influence the conical ring.

For convenience the aforementioned internal sleeve splines and external hub splines will be referred to as "basic" splines.

It has been found that, in use, known synchronisers of this general type are incapable of reliably enduring such sustained stresses as are liable to occur in the power transmissions of at least some modern motor vehicles. In practice, the basic internal splines on the sleeve and/or basic external splines on the hub tend to exhibit wear after a time and as a result the sleeve tends to slip off the hub, thereby causing undesired disengagements or declutchings of the gear.

It is an object of the present invention to overcome this drawback.

According to these and other objects, the invention consists in a synchroniser for a motor vehicle gearbox of the general type defined herein, wherein the hub is provided with a plurality of auxiliary splines larger in chordal thickness and smaller in axial length than the basic hub splines which are provided for angular keying of the sleeve with respect to the hub with freedom for axial sliding movement therebetween.

In accordance with a preferred feature of the invention, the auxiliary splines are arranged in an angular spaced relationship around the hub.

In accordance with a further preferred feature, the auxiliary splines are arranged in alternation with at least some of the basic hub splines.

These and other objects and advantages of the invention will be clear from the following description, given with reference to the accompanying drawings which are by way of example and in which.

Figure 1:
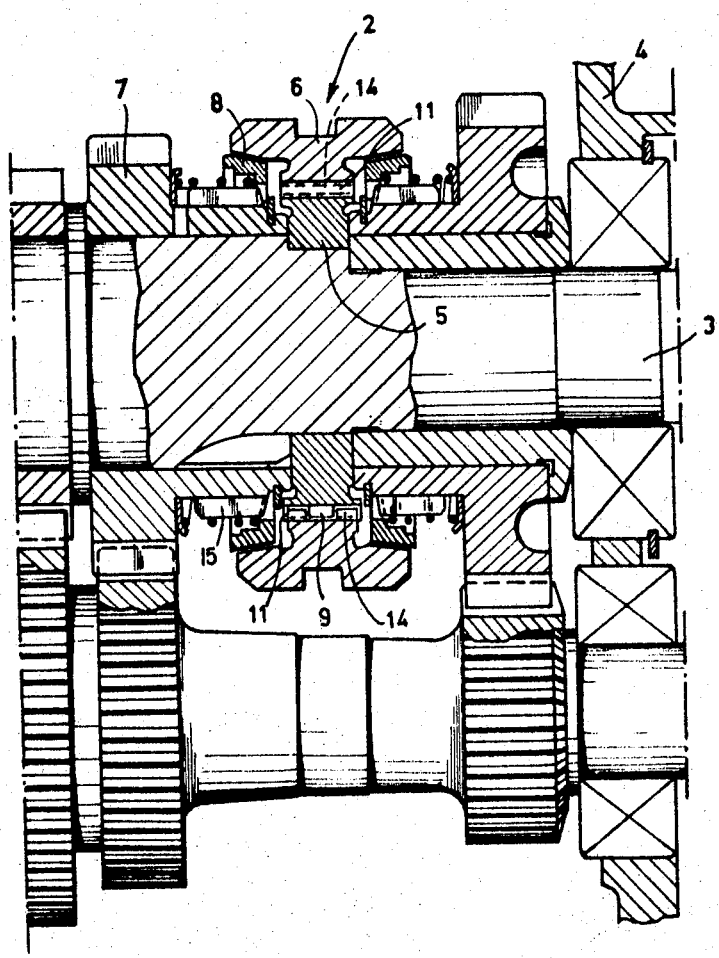
FIG. 1 is an axial sectional view of a part of a gearbox provided with the synchroniser according to the present invention.
Figure 3:
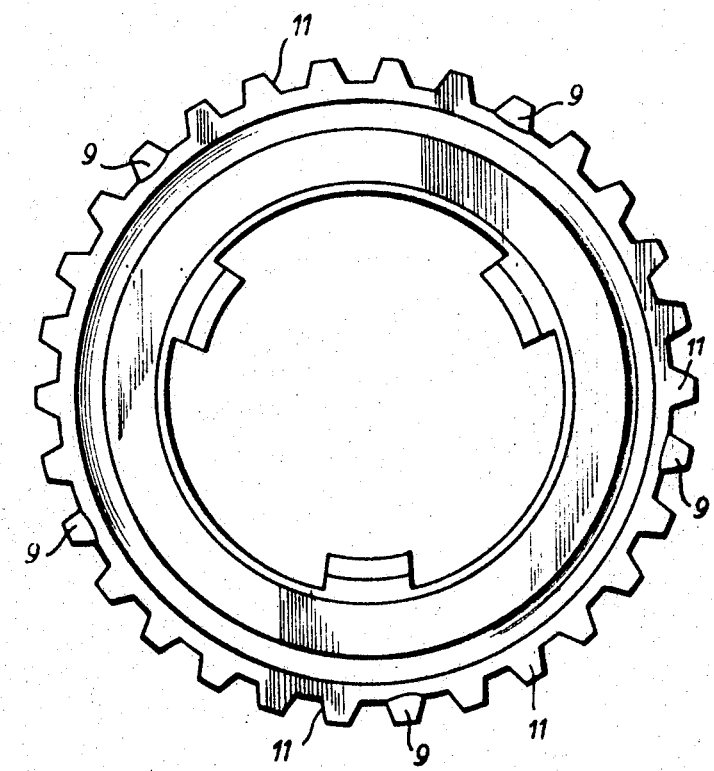
FIG. 3 is a front view of a hub which forms a part of the illustrated synchroniser.

In FIG. 1 the synchroniser as a whole is denoted 2 and will be seen to comprise a hub 5 (see also FIG. 3) which is keyed to the output shaft 3 of a gearbox 4 with which the synchroniser is associated. A sleeve 6 surrounds the hub 5 which latter is provided with a set of basic external splines 11 meshing with a basic conjugating set of internal splines 14 provide on the said sleeve 6. The sleeve 6 is in this way arranged to be angularly keyed but axially slidable with respect to the hub 5. As shown in FIG. 1, and in accordance with known techniques, a conical ring 8 is mounted on a driving toothed wheel 7.

Figure 2:
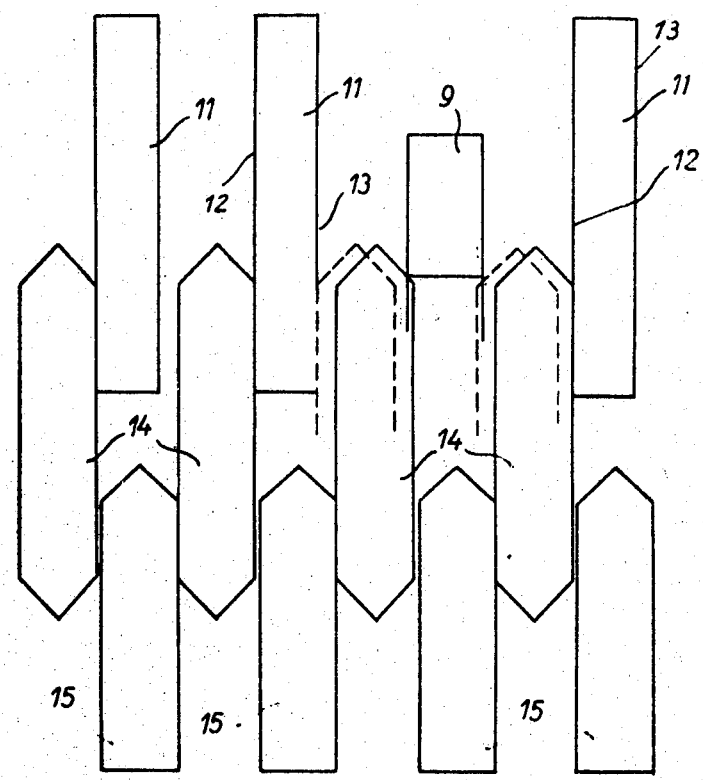
FIG. 2 is a diagrammatical representation in developed plan of the relative arrangement of the various splines on the components of the synchroniser of FIG. 1.

In FIG. 2 there are shown the basic external splines 11 of the hub 5 and the basic conjugating internal splines 14 of the seleeve 6. The teeth of the toothed wheel 7 are also shown and referenced 15 with the sleeve 6 axially displaced to engage the splines 14 therewith.

According to the invention, in order to prevent undesired axial separation of the spines 11 and 14, the hub 5 is additionally provided with a plurality of auxiliary splines 9 arranged in angularly spaced relationship around the hub 5 periphery. Also in accordance with the invention these splines 9 are of chordal thickness larger than the chordal thickness of the splines 11 thereof, and the axial length of the splines 9 is less than the axial length of the splines 11. In operation, abutment of the splines 14 against the splines 9 of the hub 5 prevents the sleeve 6 from slipping off the hub 5. This can be seen by reference to FIG. 2 wherein the inclined or bevelled end of the spline 14 is in engagement with the spline 9, thereby preventing splines 14 from disengaging with the splines 15 of wheel 7.

The amount of the aforementioned abutment is one half the chordal oversize of the splines 9 with respect to the splines 11 and occurs constantly irrespective of whether the basic splines 14 of the sleeve 6 abut the flanks referenced 12 of the basic hub splines 11 (as is diagrammatically shown in full lines in FIG. 2), or whether the splines 14 abut the opposite flanks 13 thereof (as is diagrammatically shown in broken lines in FIG. 2).

This, although the specific description refers to a synchroniser with a free conical ring, the same arrangement can of course be adopted in connection with synchronisers of other types, for instance of the type having a rigid cone ring, or a ring with outer and inner splines.

What I claim is:

1. A synchroniser for a motor vehicle gearbox of the type having a shaft, a hub, with splines around the periphery, keyed to the shaft and an internally splined sleeve in engagement therewith, the improvement comprising: the hub having a plurality of auxiliary splines which are larger in chordal thickness and smaller in axial length than the hub splines for angular keying of the said sleeve with respect to the hub with freedom for axial sliding movement one with respect to the other.

2. A synchroniser as claimed in claim 1, wherein the said auxiliary splines are arranged in an angular spaced relationship around the periphery of the hub.

3. A synchroniser as claimed in claim 1, wherein the said auxiliary splines are arranged in alternation with at least some of the hub splines.

References Cited

UNITED STATES PATENTS

| | | |
|---|---|---|
| 776,404 | 11/1904 | Keyser. |
| 2,392,762 | 1/1946 | Peterson et al. |
| 2,470,208 | 5/1949 | Avila. |

FOREIGN PATENTS

| | | |
|---|---|---|
| 615,325 | 1/1949 | Great Britain. |

CARLTON R. CROYLE, Primary Examiner

ALLAN D. HERRMANN, Assistant Examiner

U.S. Cl. X.R.

74—339